United States Patent [19]
Gross

[11] Patent Number: 5,919,565
[45] Date of Patent: Jul. 6, 1999

[54] TREE RESISTANT CABLE

[75] Inventor: Laurence Herbert Gross, Bridgewater, N.J.

[73] Assignee: Union Carbide Chemicals & Plastics Technology Corporation, Danbury, Conn.

[21] Appl. No.: 08/822,395

[22] Filed: Mar. 20, 1997

[51] Int. Cl.$^6$ ...................................................... H01B 7/28
[52] U.S. Cl. .................. 428/379; 428/461; 174/110 PM; 174/121 A; 174/121 RS
[58] Field of Search ..................................... 428/461, 379; 174/121 SR, 110 PM, 121 A

[56] References Cited

U.S. PATENT DOCUMENTS

| | | | |
|---|---|---|---|
| 3,569,610 | 3/1971 | Garner et al. | 174/102 |
| 4,144,202 | 3/1979 | Ashcraft et al. | 252/63.2 |
| 4,376,180 | 3/1983 | Turbett et al. | 524/188 |
| 4,426,498 | 1/1984 | Inoue et al. | 525/240 |
| 4,438,238 | 3/1984 | Fukushima et al. | 525/240 |
| 4,778,866 | 10/1988 | Shimada et al. | 526/245 |
| 4,859,810 | 8/1989 | Cloetens | 174/110 PM |
| 4,871,819 | 10/1989 | Oonishi et al. | 526/245 |
| 5,246,783 | 9/1993 | Spenadel et al. | 428/461 |
| 5,731,082 | 3/1998 | Gross et al. | 428/379 |

FOREIGN PATENT DOCUMENTS

| | | |
|---|---|---|
| 735545 | 10/1996 | European Pat. Off. . |
| 1229939 | 4/1971 | United Kingdom . |
| WO85/05216 | 11/1985 | WIPO . |

OTHER PUBLICATIONS

"Polyethylenes", Encyclopdia of Polymer Science and Engineering, vol. 6, pp. 386–387, 1985.

*Primary Examiner*—Paul Thibodeau
*Assistant Examiner*—D Lawrence Tarazano
*Attorney, Agent, or Firm*—Saul R. Bresch

[57] ABSTRACT

A cable comprising one or more electrical conductors or a core of one or more electrical conductors, each conductor or core being surrounded by an insulating composition comprising a mixture of (i) about 20 to about 50 percent by weight of a homogeneous polyethylene having a polydispersity in the range of about 1.5 to about 3.5 and an essentially uniform comonomer distribution; and (ii) about 50 to about 80 percent by weight of a homopolymer of ethylene made by a high pressure process.

7 Claims, No Drawings

TREE RESISTANT CABLE

TECHNICAL FIELD

This invention relates to electric power cable insulated with a polyethylene composition having an improved resistance to water trees.

BACKGROUND INFORMATION

A typical electric power cable generally comprises one or more conductors in a cable core that is surrounded by several layers of polymeric material that include a first semiconducting shield layer, an insulating layer, a second semiconducting shield layer, a metallic tape or wire shield, and a jacket. Surrounding the conductor or core can be accomplished, for example, by extrusion, coating, or wrapping.

These insulated cables are known to suffer from shortened life when installed in an environment where the insulation is exposed to water, e.g., underground or locations of high humidity. The shortened life has been attributed to the formation of water trees, which occur when an organic polymeric material is subjected to an electrical field over a long period of time in the presence of water in liquid or vapor form. The net result is a reduction in the dielectric strength of the insulation.

Many solutions have been proposed for increasing the resistance of organic insulating materials to degradation by water treeing. The most recent solutions involve the addition of polyethylene glycol, as a water tree growth inhibitor, to a heterogeneous low density polyethylene such as described in U.S. Pat. Nos. 4,305,849; 4,612,139; and 4,812, 505. Another solution is the use of a homogeneous polyethylene per se as the organic insulating material, i.e., without the addition of a water tree growth inhibitor. See U.S. Pat. No. 5,246,783. Both of these solutions appear to be steps in the right direction, but there is a continuous industrial demand for improvement partially because power cable is increasingly exposed to harsher environments, and partially because consumers are more concerned with cable longevity, e.g., a service life of 30 to 40 years.

DISCLOSURE OF THE INVENTION

An object of this invention, therefore, is to provide an insulated cable which exhibits a much improved resistance to water trees. Other objects and advantages will become apparent hereinafter.

According to the invention, an insulated cable has been discovered which meets the above object.

The cable comprises one or more electrical conductors or a core of one or more electrical conductors, each conductor or core being surrounded by an insulating composition comprising a mixture of (i) about 20 to about 50 percent by weight of a homogeneous polyethylene having a polydispersity in the range of about 1.5 to about 3.5 and an essentially uniform comonomer distribution; and (ii) about 50 to about 80 percent by weight of a homopolymer of ethylene made by a high pressure process.

DESCRIPTION OF THE PREFERRED EMBODIMENT(S)

Homogeneous polyethylenes are copolymers of ethylene, one or more alpha-olefins, and, optionally, a diene. A copolymer is a polymer formed from the polymerization of two or more monomers and includes terpolymers, tetramers, etc. The alpha-olefins can have 3 to 12 carbon atoms, and preferably have 3 to 8 carbon atoms. Examples of the alpha-olefins are propylene, 1-butene, 1-hexene, 4-methyl-1-pentene, and 1-octene. As noted above, the polymers have a polydispersity (Mw/Mn) in the range of about 1.5 to about 3.5 and an essentially uniform comonomer distribution. The homogeneous polyethylenes are characterized by single and relatively low DSC melting points. Heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The homogeneous polyethylenes can have a density in the range of 0.86 to 0.94 gram per cubic centimeter, and preferably have a density in the range of 0.87 to about 0.93 gram per cubic centimeter. They also can have a melt index in the range of about 0.5 to about 30 grams per 10 minutes, and preferably have a melt index in the range of about 0.5 to about 5 grams per 10 minutes.

Homogeneous polyethylenes can be prepared, for example, with vanadium based catalyst systems such as those described in U.S. Pat. Nos. 5,332,793 and 5,342,907, and they can also be, and are preferably, prepared with single site metallocene catalyst systems such as those described in U.S. Pat. Nos. 4,937,299 and 5,317,036.

The homopolymer of ethylene can be prepared, for example, by the high pressure process described in Introduction to Polymer Chemistry, Stille, Wiley and Sons, New York, 1962, at pages 149 to 151. The density of the homopolymer can be in the range of 0.916 to 0.930 gram per cubic centimeter, and is preferably in the range of 0.920 to 0.928 gram per cubic centimeter. The melt index can be in the range of about 1 to about 10 grams per 10 minutes, and is preferably in the range of about 1.5 to about 5 grams per 10 minutes. Melt index is determined in accordance with ASTM D-1238, Condition E, measured at 190 degrees C.

The amount of ethylene homopolymer that can be in the insulating composition can be in the range of about 50 to about 80 percent by weight, and is preferably in the range of about 60 to about 75 percent by weight. The amount of homogeneous polyethylene that can be in the insulating composition can be in the range of about 20 to about 50 percent by weight, and is preferably in the range of about 25 to about 40 percent by weight. The percentages are based on the weight of the mixture of homopolymer and homogeneous polyethylene.

Conventional additives, which can be introduced into the polyethylene formulation, are exemplified by antioxidants, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Fillers and additives can be added in amounts ranging from less than about 0.1 to more than about 200 parts by weight for each 100 parts by weight of the base resin, in this case, polyethylene.

Examples of antioxidants are: hindered phenols such as tetrakis [methylene(3,5-di-tert- butyl-4-hydroxyhydrocinnamate)]methane, bis[(beta-(3,5-ditert-butyl-4-hydroxybenzyl)methylcarboxyethyl)]sulphide, 4,4'-thiobis(2-methyl-6-tert -butylphenol), 4,4'-thiobis(2-tert-butyl-5-methylphenol), 2,2'-thiobis(4-methyl-6-tertbutylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl -phosphonite; thio compounds such as dilaurylthiodipropionate, dimyristylthiodipropionate, and distearylthiodipropionate; various siloxanes; and various amines such as polymerized 2,2,4-trimethyl -1,2-dihydroquinoline. Antioxidants can be used in amounts of about 0.1 to about 5 parts by weight per 100 parts by weight of polyethylene.

The resins in the formulation can be crosslinked by adding a crosslinking agent to the composition or by making the resin hydrolyzable, which is accomplished by adding hydrolyzable groups such as —Si(OR)$_3$ wherein R is a hydrocarbyl radical to the resin structure through copolymerization or grafting.

Suitable crosslinking agents are organic peroxides such as dicumyl peroxide; 2,5-dimethyl-2,5-di(t-butylperoxy) hexane; t-butyl cumyl peroxide; alpha,alpha-bis(tert-butylperoxy)diisopropylbenzene; and 2,5-dimethyl-2,5-di(t-butylperoxy)hexane-3. Dicumyl peroxide is preferred.

Hydrolyzable groups can be added, for example, by copolymerizing (in the case of the homogeneous polyethylene) ethylene and comonomer(s) with an ethylenically unsaturated compound having one or more —Si(OR)$_3$ groups such as vinyltrimethoxysilane, vinyltriethoxysilane, and gamma -methacryloxypropyltrimethoxysilane or grafting these silane compounds to the either resin in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred.

Examples of hydrolyzable copolymers and hydrolyzable grafted copolymers are ethylene/comonomer/vinyltrimethoxy silane copolymer, ethylene/comonomer/gamma -methacryloxypropyltrimethoxy silane copolymer, vinyltrimethoxy silane grafted ethylene/comonomer copolymer, vinyltrimethoxy silane grafted linear low density ethylene/1-butene copolymer, and vinyltrimethoxy silane grafted low density polyethylene or ethylene homopolymer.

The cable of the invention can be prepared in various types of extruders, e.g., single or twin screw types. Compounding can be effected in the extruder or prior to extrusion in a conventional mixer such as a BRABENDER™ mixer or a BANBURY™ mixer. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked after extrusion, the die of the crosshead feeds directly into a heating zone, and this zone can be maintained at a temperature in the range of about 130° C. to about 260° C., and preferably in the range of about 170° C. to about 220° C.

The advantages of the invention lie in (I) the much improved water tree growth rate; (II) that additives used to enhance water tree resistance can be avoided; (III) that the "all" polyethylene composition takes full advantage of the desirable electrical characteristics of polyethylene, for example, its low dissipation factor; and (IV) the composition being useful in low, medium, and high voltage applications.

The patents and publication mentioned in this specification are incorporated by reference herein. The invention is illustrated by the following examples.

EXAMPLES 1 TO 12

The resistance of insulating compositions to water treeing is determined by the method described in U.S. Pat. No. 4,144,202. This measurement leads to a value for water tree resistance relative to a standard polyethylene insulating material. The term used for the value is "water tree growth rate" (WTGR). Water tree length (WTL) is also measured. The WTL is the fraction of the thickness through which the water tree has grown. The lower the values of WTGR and WTL, the better the water tree resistance. The WTGR and WTL values are stated in percent.

100 parts by weight of each of the mixtures of polyethylenes described below are compounded in a twin screw extruder with 0.18 part by weight of the primary antioxidant, thiodiethylene bis(3,5-di -tert-butyl-4-hydroxy)hydrocinnamate; 0.18 part by weight of the secondary antioxidant, distearyl thio dipropionate; and sufficient dicumyl peroxide to provide an oscillating disk rheometer (5 degree arc at 182 degrees C. with a 20 second preheat) reading of 48 inch-pound of torque. The twin screw compounding equipment is a BRABENDER™ twin screw compounder. It has two counter-rotating intermeshing screws. The temperature of the set points in the barrel is from 100 degrees C. in the throat area of the hopper increasing up to 150 degrees C. at the downstream exit region of the compounder. The melt temperature is about 150 to about 155 degrees C. The compounder yields strands of resin, each strand having diameter of about ⅛ inch, which are then diced into pellets. Re-compounding at the same conditions is effected to insure uniform additive composition. The final pellets are molded into one inch discs which are 0.25 inch thick in a press in two steps:

|  | initial step | final step |
|---|---|---|
| pressure (psi) | low | high |
| temperature (°C.) | 120 | 175 |
| residence time (minutes) | 9 | 15 to 20 |

Each plaque is tested for WTGR and the results compared with a control polyethylene homopolymer, which exhibits 100 percent WTGR. WTL is also measured. Variables and results are set forth in Table I:

TABLE I

| Example | polyethylene mixture (% HPPE/ % metallocene PE) | WTGR (percent)* | WTL (percent)* |
|---|---|---|---|
| 1 | 95/5 | 484 | 26.00 |
| 2 | 90/10 | 220 | 18.00 |
| 3 | 80/20 | 53 | 7.75 |
| 4 | 80/20 | 34 | 7.34 |
| 5 | 75/25 | 4 | 3.00 |

TABLE I-continued

| Example | polyethylene mixture (% HPPE/ % metallocene PE) | WTGR (percent)* | WTL (percent)* |
|---|---|---|---|
| 6 | 75/25 | 24 | 5.64 |
| 7 | 70/30 | 25 | 5.73 |
| 8 | 70/30 | 18 | 5.62 |
| 9 | 60/40 | 14 | 5.05 |
| 10 | 50/50 | 15 | 5.04 |
| 11 | 50/50 | 37 | 8.00 |
| 12 | 0/100 | 101 | 10.00 |

*Variations in WTGRs and WTLs from one set of experiments to the next are to be expected.
Notes to Table I:
1. A description of the metallocene polyethylenes (metallocene PE) follows (each polyethylene is prepared with a single site metallocene catalyst): The metallocene PEs used in examples 1, 2, 3, 5, 6, 7, 11, and 12 = a copolymer of ethylene and 1-octene having an Mw/Mn ratio of about 2; a narrow comonomer distribution; 24 percent by weight 1-octene; a melt index of 1 gram per 10 minutes; and a density of 0.870 gram per cubic centimeter. The metallocene PEs used in examples 4, 8, 9, and 10 = a copolymer of ethylene and 1-octene having an Mw/Mn ratio of about 2; a narrow comonomer distribution; 24 percent by weight 1-octene; a melt index of 5 grams per 10 minutes; and a density of 0.870 gram per cubic centimeter.
Note:
a description of metallocene resins as well as molecular weight, molecular weight distribution, and comonomer distribution with respect to these resins can be found in United States patent 5,246,783 at column 4, line 13, to column 5, line 9.
2. HPPE = a homopolymer of ethylene prepared by a high pressure process having a melt index of 2 grams per 10 minutes and a density of 0.923 gram per cubic centimeter. High pressure preparation is accomplished by the use of a tubular reactor operating between 28,000 and 40,000 psi and from 220 to 230 degrees C. Organic peroxide initiators are utilized to provide free radicals for the reaction and a chain transfer agent is used.
3. % HPPE/% metallocene PE = The first number is the percent of HPPE and the second number is the percent of metallocene polyethylene in the mixture.
4. WTGR and WTL are described above.

EXAMPLES 13 AND 14

The resin for example 13 is prepared as follows. A blend of 25 percent by weight of a homogeneous metallocene catalyzed copolymer having a melt index of 1 gram per 10 minutes and a density of 0.91 gram per cubic centimeter made up of 24 percent by weight 1-octene and 76 percent by weight ethylene and 75 percent by weight of a high pressure produced homopolymer of ethylene having a melt index of 2 grams per 10 minutes and a density of 0.923 gram per cubic centimeter are compounded with 0.18 part by weight of the primary antioxidant, thiodiethylene bis(3,5-di-tert-butyl-4-hydroxy)hydro-cinnamate; 0.18 part by weight of the secondary antioxidant, distearyl thio dipropionate; and sufficient dicumyl peroxide to provide an oscillating disk rheometer (5 degree arc at 182 degrees C. with a 20 second preheat) reading of 48 inch-pound of torque, in a ZSK compounder with two co-rotating intermeshing screws made up of modular screw elements at a melt temperature of 180 C. The pellets formed after passage through an underwater pelletizer and dryer are used to coat a conductor.

Example 14 is the same as example 13 except that the homogeneous metallocene catalyzed copolymer is omitted.

The wire coating is accomplished by the use of a 2.5 inch ROYLE™ extruder. A 14 AWG (American Wire Gauge) copper conductor with a 0.064 diameter is used. A triple crosshead allows all three layers to be extruded at one time. The first layer (the layer closest to the copper conductor) of a semiconductive polymeric material is extruded with a 0.7 millimeter thickness. The insulation second or middle layer made with the example 13 or the example 14 material is extruded at 1.5 millimeter thickness, and the outer layer of a semiconductive polymeric material is extruded at 0.15 millimeter thickness. The cables are cured in a steam environment for 5 minutes at atmospheric pressure. Two cables are prepared for each example. One cable for each example will be aged and one cable for each example will not be aged.

After extrusion, the two cables to be aged are stored at 90 degrees C. for 16 hours in an air oven. Each of the cables to be aged is cut into 12 pieces, each having a length of 3.2 meters. The copper conductor is then removed and a 0.75 millimeter diameter conductor is inserted in the conductor channel. Demineralized water is used to fill the extra conductor space. All the pieces of cable are placed in a 70 degree C. tap water bath.

The 12 pieces of each of the cables to be aged are connected in series and a current of 18 amperes is applied to maintain a conductor temperature of 85 degrees C. A 9 kilovolt electrical stress is also applied. After aging for 1000 hours, the cable pieces are allowed to cool down.

The two cables, which are not aged, are cut into pieces, each piece being 3.8 meters in length. The pieces are stored for 1000 hours in ambient air. They are then treated for 16 hours at 90 degrees C.

An electrical breakdown test is performed on the pieces using a ramp-rise test at 2 kilovolts/second.

The results are shown in Table II:

TABLE II

| WEIBULL CHARACTERISTIC BREAKDOWN STRENGTH (63% VALUE) | | |
|---|---|---|
| Example | 13 | 14 |
| No aging (kV/mm) | 95.0 | 93.4 |
| With aging (kV/mm) | 90.1 | 42.1 |
| Retention of Original BD Strength (%) | 94.8 | 45.1 |

Notes to Table II:
1. kV/mm = kilovolts per millimeter.
2. BD = breakdown
The results (the higher number is better) clearly show the significant advantage for Example 13 with the blend of the two resins over Example 14 with the one resin.

I claim:
1. A cable comprising one or more electrical conductors or a core of one or more electrical conductors, each conductor or core being surrounded by an insulating composition comprising a mixture of
   (i) about 20 to about 50 percent by weight of a homogeneous polyethylene having a polydispersity in the range of about 1.5 to about 3.5 and an essentially uniform comonomer distribution; and
   (ii) about 50 to about 80 percent by weight of a homopolymer of ethylene made by a high pressure process.
2. The cable defined in claim 1 wherein the homogeneous polyethylene is a copolymer of ethylene, one or more alpha-olefins, each having 3 to 12 carbon atoms, and, optionally, a diene.
3. The cable defined in claim 1 wherein the homogeneous polyethylene is made with a single site metallocene catalyst system.
4. The cable defined in claim 1 wherein the homogeneous polyethylene has a density in the range of 0.86 to 0.94 gram per cubic centimeter and a melt index in the range of about 0.5 to about 30 grams per 10 minutes.

5. The cable defined in claim 2 wherein the alpha-olefin is 1-butene, 1-hexene, 4-methyl-1-pentene, or 1-octene.

6. The cable defined in claim 1 wherein the ethylene homopolymer has a density in the range of 0.916 to 0.930 gram per cubic centimeter and a melt index in the range of about 1 to about 10 grams per 10 minutes.

7. A cable comprising one or more electrical conductors or a core of one or more electrical conductors, each conductor or core being surrounded by an insulating composition comprising a mixture of (i) about 25 to about 40 percent by weight of a homogeneous polyethylene made with a single site metallocene catalyst system having a polydispersity in the range of about 1.5 to about 3.5 and an essentially uniform comonomer distribution; and (ii) about 60 to about 75 percent by weight of a homopolymer of ethylene made by a high pressure process.

* * * * *